US012058954B2

(12) United States Patent
Grimm et al.

(10) Patent No.: US 12,058,954 B2
(45) Date of Patent: Aug. 13, 2024

(54) SYSTEM FOR SPRAYING PLANTS AND/OR PLANT PRECURSORS

(71) Applicant: Capstan Ag Systems, Inc., Topeka, KS (US)

(72) Inventors: Jeffrey John Grimm, Holton, KS (US); Troy C. Kolb, Hiawatha, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 632 days.

(21) Appl. No.: 17/249,139

(22) Filed: Feb. 22, 2021

(65) Prior Publication Data

US 2022/0046849 A1 Feb. 17, 2022

Related U.S. Application Data

(63) Continuation of application No. 15/706,174, filed on Sep. 15, 2017, now Pat. No. 10,925,206, which is a continuation of application No. 13/857,348, filed on Apr. 5, 2013, now Pat. No. 9,763,381.

(60) Provisional application No. 61/622,745, filed on Apr. 11, 2012.

(51) Int. Cl.
*A01C 7/06* (2006.01)
*A01C 7/10* (2006.01)
*A01C 23/00* (2006.01)
*B05B 12/08* (2006.01)

(52) U.S. Cl.
CPC ............... *A01C 7/06* (2013.01); *A01C 7/105* (2013.01); *A01C 23/007* (2013.01); *B05B 12/085* (2013.01)

(58) Field of Classification Search
CPC ......... A01C 7/06; A01C 7/105; A01C 23/007; A01C 23/005; A01C 23/04; A01C 23/047; A01C 23/023; A01M 7/0089; B05B 12/085; B05B 12/16; B05B 12/02; F16K 27/029; F16K 31/0606
See application file for complete search history.

(56) References Cited

U.S. PATENT DOCUMENTS

| | | |
|---|---|---|
| 3,322,080 A | 5/1967 | Gatzke |
| 3,373,705 A | 3/1968 | Hansen |
| 3,450,074 A | 6/1969 | Harold |
| RE31,023 E | 9/1982 | Hall, III |
| 4,448,820 A | 5/1984 | Buschor |
| 4,530,463 A | 7/1985 | Hiniker et al. |
| 4,561,565 A | 12/1985 | Wolf et al. |
| 4,765,263 A | 8/1988 | Wilkins |
| 5,024,173 A | 6/1991 | Deckler |
| 5,134,961 A | 8/1992 | Giles et al. |
| 5,379,812 A | 1/1995 | McCunn et al. |
| 5,650,609 A | 7/1997 | Mertins et al. |
| 5,653,389 A | 8/1997 | Henderson et al. |

(Continued)

FOREIGN PATENT DOCUMENTS

EP 1000540 A1 5/2000

OTHER PUBLICATIONS

Australian Office Action issued in connection with Austrailian Patent Application No. 2013203361, dated Oct. 15, 2014 6 pgs.

(Continued)

*Primary Examiner* — Trinh T Nguyen
(74) *Attorney, Agent, or Firm* — Armstrong Teasdale LLP

(57) ABSTRACT

Various embodiments of a system for automatically sensing and spraying plants and/or plant precursors as they are planted or otherwise distributed on and/or within the ground is disclosed.

21 Claims, 2 Drawing Sheets

(56) References Cited

U.S. PATENT DOCUMENTS

| | | |
|---|---|---|
| 5,744,793 A | 4/1998 | Skell et al. |
| 5,847,389 A | 12/1998 | Mertins et al. |
| 5,848,571 A | 12/1998 | Stufflebeam et al. |
| 5,921,019 A | 7/1999 | Baek |
| 5,924,371 A | 7/1999 | Flamme et al. |
| 6,047,652 A | 4/2000 | Prairie et al. |
| 6,070,539 A | 6/2000 | Flamme et al. |
| 6,216,615 B1 | 4/2001 | Romans |
| 6,273,010 B1 | 8/2001 | Luxon |
| 6,289,829 B1 | 9/2001 | Fish et al. |
| 6,453,832 B1 | 9/2002 | Schaffert |
| 6,477,967 B2 | 11/2002 | Rosenboom |
| 6,481,647 B1 | 11/2002 | Keaton et al. |
| 6,516,733 B1 | 2/2003 | Sauder et al. |
| 6,763,773 B2 | 7/2004 | Schaffert |
| 7,311,004 B2 | 12/2007 | Giles |
| 7,370,589 B2 | 5/2008 | Wilkerson et al. |
| 7,502,665 B2 | 3/2009 | Giles et al. |
| 7,868,242 B2 | 1/2011 | Takahashi |
| 8,074,585 B2 | 12/2011 | Wilkerson et al. |
| 9,435,458 B2 | 9/2016 | Needham et al. |
| 9,763,381 B2 | 9/2017 | Grimm et al. |
| 10,925,206 B2 | 2/2021 | Grimm et al. |
| 2004/0231575 A1 | 11/2004 | Wilkerson et al. |
| 2006/0273189 A1 | 12/2006 | Grimm et al. |
| 2010/0032492 A1 | 2/2010 | Grimm et al. |
| 2012/0228395 A1 | 9/2012 | Needham et al. |

OTHER PUBLICATIONS

Canadian Office Action issued in connection with Canadian Patent Application No. 2,811,726, dated Aug. 13, 2018, 4 pgs.
Canadian Office Action issued in connection with Canadian Patent Application No. 2,811,726, dated Aug. 21, 2020, 4 pgs.
Canadian Office Action issued in connection with Canadian Patent Application No. 2,811,726, dated Jan. 17, 2020, 6 pgs.
Ghidiu, G. M. et al., "A New Method of Soil Application of Aldicarb," Published in J. Prod. Agric. 8:43-45 (1) (1995), 3 pgs.
Curley, Robert G., et al., "Planter Attachment for the Spot Application of Soil Anticrustant," Paper No. 91-1013, ASAE Meeting Presentation, Jun. 23-26, 1991, Albuquerque, New Mexico, 11 pgs.
Hancock, John A., "Design and Evaluation of a Seed-Specific Applicator for In-Furrow Chemical Application," A Thesis Presented for the Master of Science Degree, University of Tennessee, Knoxville, May 2003, 172 pgs.
Lohmeyer, K. H., et al., "Precision Application of Aldicarb to Enhance Efficiency of Thrips (Thysanoptera: Thripidae) Management in Cotton," Journal of Economic Entomology, 96(3):748-754. 2003, Published by the Entomological Society of America, 8 pgs.

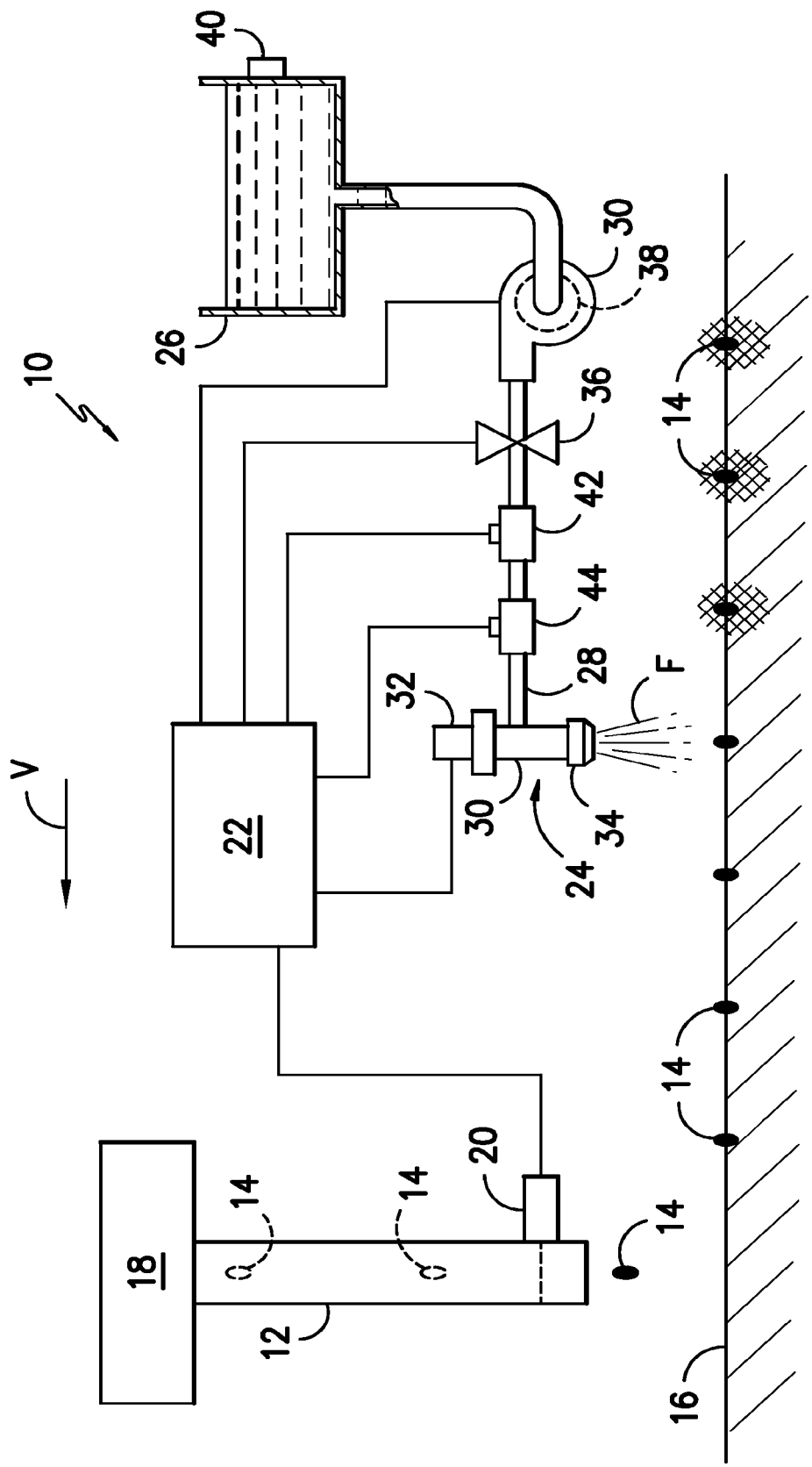
FIG. -1-

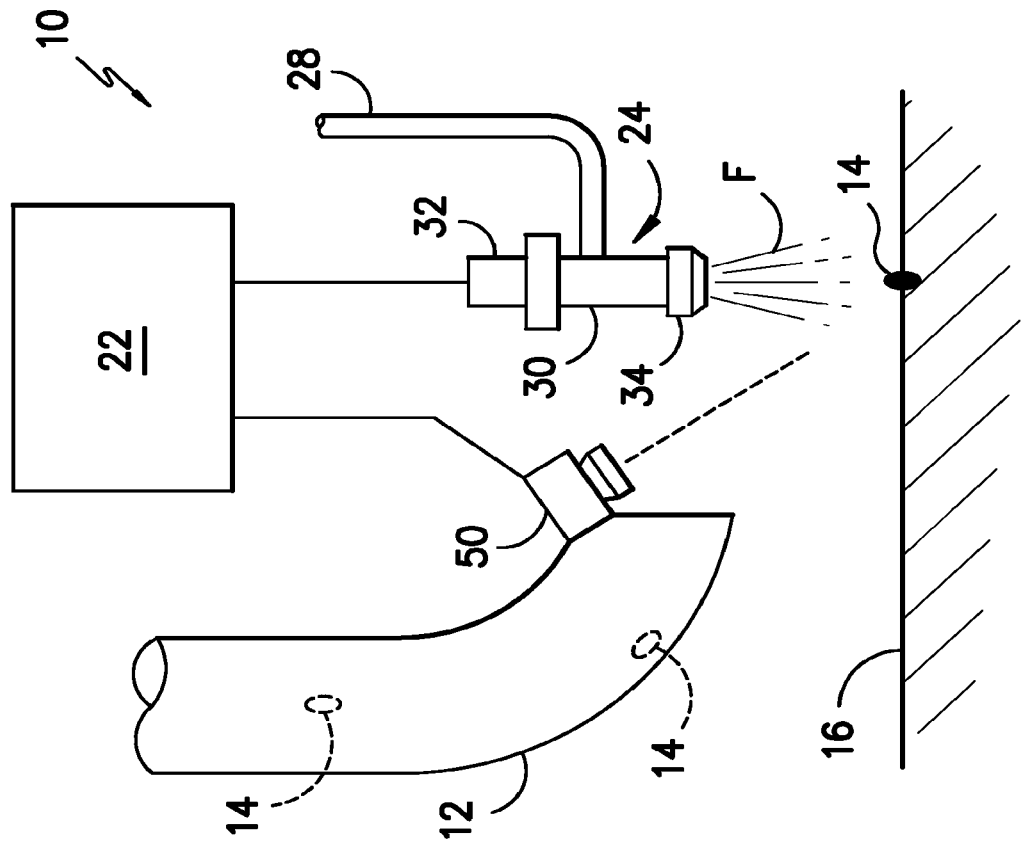
FIG. -3-
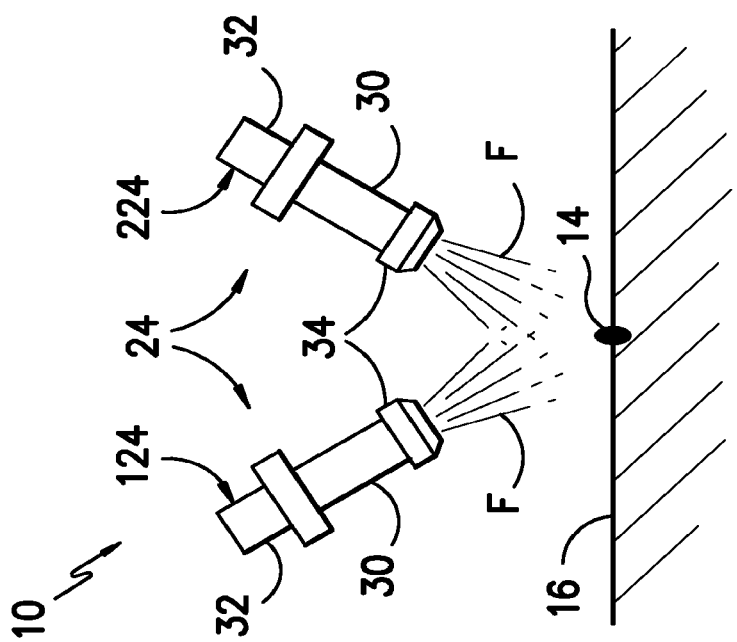
FIG. -2-

SYSTEM FOR SPRAYING PLANTS AND/OR PLANT PRECURSORS

CROSS-REFERENCE TO RELATED APPLICATIONS

This application is a continuation of U.S. patent application Ser. No. 15/706,174, filed on Sep. 15, 2017, which is a continuation of U.S. patent application Ser. No. 13/857,348, filed on Apr. 5, 2013, which claims priority to U.S. Provisional Patent Application No. 61/622,745, filed on Apr. 11, 2012, and entitled "System for Spraying Plants and/or Plant Precursors," the disclosures of which are hereby incorporated by reference in their entirety for all purposes.

FIELD OF THE INVENTION

The present subject matter relates generally to a system for spraying plants and/or plant precursors and, more particularly, to a system that automatically senses and sprays plants and/or plant precursors as they are planted or otherwise distributed on and/or within the ground.

BACKGROUND OF THE INVENTION

In the agricultural industry, plants and plant precursors (e.g., seeds) are often sprayed with an agricultural fluid at the time of planting in order to enhance germination and early development. For example, when planting certain crops, it is often desirable to spray fertilizers, pesticides, insecticides, fungicides and/or various other agricultural fluids directly over and/or adjacent to seed placements. To simplify this process, various spraying systems have been developed that are designed to spray a fluid onto seeds as they are planted or otherwise distributed on and/or within the ground.

However, such conventional spraying systems are typically configured to spray a continuous band of fluid across the length of the row in which the seeds are being planted. Accordingly, a significant amount of fluid is sprayed in the areas located between the seeds, resulting in excessive waste and increased material costs. These issues have become particularly relevant given the recent trend of narrowing the spacing between crop rows. For example, in the corn growing industry, narrow row spacings (e.g., 20 inches or less) have replaced traditional row spacings (e.g., 30 inches or more) in an attempt to provide higher seed populations and a quicker canopy for weed control. However, to implement such narrow row spacings, the seed spacing along each row must be increased, thereby widening the gap between each planted seed. As a result, the waste and material costs associated with the use of conventional spraying systems is even further increased.

To avoid the problems associated with continuous band spraying systems, improved spraying systems have been developed that provide for seed-specific placement of agricultural fluids. For example, U.S. Pat. Nos. 7,370,589 and 8,074,585 (Wilkerson et al.), both of which are hereby incorporated by reference herein in their entirety for all purposes, disclose a system that utilizes a sensor to detect seeds passing through a seed tube. Upon the detection of a seed, the sensor transmits information to a controller configured to control the operation of a fluid dispenser such that the fluid dispenser dispenses fluid onto the seed at a predetermined time after the seed is detected by the sensor. While this system provides advantages over conventional, continuous band spraying systems, further improvements are needed to address the ever-changing demands of the agricultural industry.

BRIEF DESCRIPTION OF THE INVENTION

Aspects and advantages of the invention will be set forth in part in the following description, or may be obvious from the description, or may be learned through practice of the invention.

Various embodiments of a system for automatically sensing and spraying plants and/or plant precursors as they are planted or otherwise distributed on and/or within the ground is disclosed.

For example, in several embodiments, the system may include a sensor configured to detect seeds dropping onto the ground through a seed tube and a controller communicatively coupled to the sensor. In addition, the system may include a nozzle assembly having a valve and a spray nozzle. The controller may be configured to control the operation of the valve based on signals received from the sensor such that an amount of fluid may be sprayed from the spray nozzle on and/or adjacent to each seed after it is dropped from the seed tube.

In addition, in one embodiment, the controller may be configured to control the operation of the valve such that a specific volume of fluid is applied on and/or adjacent to each seed. For instance, the controller may be configured to control the duration of the valve pulse based on various operating parameters, such as the pressure of the fluid supplied to the valve, the valve configuration (e.g., the sizes of the inlet and/or outlet of the valve), the nozzle configuration (e.g., the spray tip orifice size), the speed of the system and/or the like.

In another embodiment, the controller may be configured to control the valve such that it operates at a constant pulse duration.

Moreover, in one embodiment, the controller may be configured to control a flow rate of the fluid supplied to the valve.

Further, in one embodiment, the controller 22 may be configured to control the pressure of the fluid supplied to the valve.

Additionally, in one embodiment, the system may include multiple nozzle assemblies. In such an embodiment, the nozzle assemblies may, for example, be configured to spray various different fluids on and/or adjacent to each seed and/or spray fluid(s) at various different locations relative to each seed.

Moreover, in one embodiment, the system may include a camera configured to capture one or more images of each seed as it is being sprayed by the nozzle assembly. In such an embodiment, the controller may, for example, be configured to control the operation of the camera based on the signals received from the sensor. For instance, the controller may be configured to control the camera such that it captures an image at a predetermined time after a seed is detected by the sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified view of one embodiment of a system that automatically senses and sprays plants and/or plant precursors as they are planted or otherwise distributed on and/or within the ground;

FIG. 2 illustrates a simplified view of another embodiment of the system shown in FIG. 1, particularly illustrating the system including two nozzle assemblies; and FIG. 3 illustrates a simplified view of a further embodiment of the system shown in FIG. 1, particularly illustrating the system including a camera for capturing images of seeds as they are sprayed.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a simplified view of one embodiment of an agricultural spraying system 10 in accordance with aspects of the present subject matter. In general, the system 10 may be designed to be coupled to a piece of farming equipment (not shown), such as a tractor or other work vehicle. The system 10 may include a seed tube 12 for dropping seeds 14 on the ground 16 as the system 10 moves at a speed V relative to the ground 16. The seeds 14 may be supplied to the seed tube 12 from a suitable seed source 18 (e.g., a seed hopper). A seed sensor 20 may be operatively connected to the seed tube 12 for detecting each seed 14 as it drops through the seed tube 12. Suitable seed sensors may include optical sensors and/or any other suitable object sensor known in the art. The seed sensor 20 may be communicatively coupled to a controller 22. As such, each time the seed sensor 20 detects a seed 14 dropping through the seed tube 12, a signal may be transmitted from the seed sensor 20 to the controller 22.

Additionally, the system 10 may also include a nozzle assembly 24 for spraying each seed 14 with a metered amount of fluid F. As shown in FIG. 1, fluid F may be supplied to the nozzle assembly 24 from a suitable fluid source 26 (e.g., a fluid tank) via a pipe 28 or other suitable flow conduit. In addition, a pump 30, such as centrifugal pump, may be positioned downstream of the fluid source 26 for pumping fluid F from the fluid source 26 to the nozzle assembly 24.

As shown in the illustrated embodiment, the nozzle assembly 24 may generally include a spray nozzle 30 and a solenoid valve 32. In general, the spray nozzle 30 may have any suitable nozzle configuration known in the art. For instance, in one embodiment, the spray nozzle 30 may include a spray tip 34, such as a flat fan tip, cone tip, straight stream tip and/or any other suitable spray tip known in the art. In other embodiments, the spray nozzle 30 may have any other suitable nozzle configuration, such as by being configured as a microtube, knife, coulter, drip tube and/or the like. Similarly, the valve 32 may generally have any suitable valve configuration known in the art. For instance, in several embodiments, the valve 32 may be configured as a latching solenoid valve, 2WNC solenoid valve, pilot actuated solenoid valve, flipper solenoid valve and/or the like.

In a particular embodiment of the present subject matter, the valve 32 may be configured the same as or similar to the valves disclosed in U.S. patent application Ser. No. 13/410,589 (Needham et al), filed on Mar. 2, 2012 and entitled "Electrically Actuated Valve for Control of Instantaneous Pressure Drop and Cyclic Durations of Flow," which is hereby incorporated by reference herein in its entirety for all purposes. Specifically, Needham et al. discloses a solenoid valve in which the valve poppet is configured to be pulsed such that the cyclic durations of the poppet control the average flow rate through the valve. For example, the valve may be operated with a pulse-width modulation, in which the poppet moves from a sealed position to an open position relative to the valve inlet and/or valve outlet and the duty cycle of the pulse controls the average flow rate. Additionally, the pressure drop across the valve may be controlled during each pulse of the poppet by regulating the position to which the poppet is moved relative to the valve inlet and/or the valve outlet. For instance, the displacement of the poppet may be regulated such that the valve is partially opened during each pulse.

Referring still to FIG. 1, in several embodiments the valve 32 may be configured to be mounted to and/or integrated within a portion of the spray nozzle 30 using any suitable mounting configuration and/or any other suitable configuration known in the art that permits the flow of fluid F through the nozzle 30 to be modified using pulse width modulation (PWM) technology. For example, the valve 32 may be mounted to the exterior of the body of the spray nozzle 30, such as by being secured to the spray nozzle 30 through the nozzle's check valve port. Alternatively, the valve 32 may be integrated into a portion of the body of the spray nozzle 30.

Moreover, in several embodiments, the valve 32 may be communicatively coupled to the controller 22. Accordingly, the controller 22 may be configured to transmit a suitable control signal to the valve 32 to cause it to open, remain open for a calculated duration, and close, thereby spraying a metered amount of fluid F on and/or adjacent to the seed 14.

It should be appreciated that the controller 22 may be configured to determine when to open and close the valve 32 by analyzing various operating parameters of the system 10, which may be pre-stored within the controller's memory and/or received by the controller 22 as an input. Such operating parameters may include, but are not limited to, the vertical distance each seed 14 falls between the seed sensor 20 and the ground 16, the horizontal distance between the outlet of the seed tube 12 and the nozzle assembly 24, the speed V of the system 10 and/or any other suitable operating parameters. Based on such analysis, the controller 22 may be configured to calculate a suitable time delay for actuating the valve 32 (i.e., the amount of time between the when the seed sensor 20 detects a seed 14 and when the valve 32 needs to be opened to spray fluid F on and/or adjacent to each seed 14).

In addition to determining the time delay for actuating the valve 32, the controller 22 may also be configured to control the operation of the valve 32 such that a specific volume of fluid F is applied on and/or adjacent to each seed 14. Specifically, in several embodiments, the controller 22 may be configured to analyze one or more operating parameters of the system 10 in order to determine the duration of the valve pulse (i.e., the amount of time the valve 32 is opened) needed to achieve a desired spray volume for each seed 14. Such operating parameters may include, but are not limited to, the pressure of the fluid F supplied to the valve 32, the valve configuration (e.g., the sizes of the inlet and/or outlet of the valve 32), the nozzle configuration (e.g., the spray tip orifice size), the speed V of the system 10 and/or any other suitable operating parameters. By analyzing such operating parameters, the controller 22 may be configured control the duration of the valve pulse in a manner that allows the same amount fluid F to be sprayed on and/or adjacent to each seed 14.

Alternatively, the controller 22 may be configured to implement a fixed application approach, wherein the valve 32 is operated at a constant pulse duration. In such an embodiment, the specific volume of fluid F applied on and/or adjacent to each seed 14 may generally vary depending on the speed V of the system 10 and/or the pressure of the fluid F supplied to the valve 32.

Moreover, in one embodiment, the controller 22 may also be configured to control a flow rate of the fluid F supplied to the valve 32 by the controlling the operation of a suitable flow regulating valve 36. For example, the controller 22 may be configured to determine the flow rate of the fluid F supplied through the pipe 28 based on inputs received from one or more suitable meters and/or sensors positioned upstream of the valve 32, such as one or more turbine meters 38 associated with the pump 30, one or more tank level meters 40 associated with the fluid source 26, one or more flow meters 42 associated with the pipe 28, one or more pressure sensors 44 and/or the like. In addition, the controller 22 may also be configured to receive user inputs corresponding to a desired flow rate for the system 10. Accordingly, based on such inputs, the controller 22 may be configured to control the operation of the flow regulating valve 36 so as to maintain the fluid F supplied to the valve 32 at the desired flow rate.

Further, in one embodiment, the controller 22 may also be configured to control the pressure of the fluid F supplied to the valve 32. For example, one or more pressure sensors 44 may be configured to monitor the pressure of the fluid F and transmit pressure measurements to the controller 22. The controller 22 may, in turn, be configured to pulse the valve 32 at a suitable frequency and/or duty cycle in order to maintain a specific pressure within the pipe 28. Such pressure based control may allow the controller 22 to vary the amount of fluid F being sprayed on and/or adjacent to each seed 14 while operating the valve at a constant pulse duration.

It should be appreciated that controller 22 may generally comprise any suitable computer and/or other processing unit, including any suitable combination of computers, processing units and/or the like that may be operated independently or in connection within one another. Thus, in several embodiments, the controller 22 may include one or more processor(s) and associated memory device(s) configured to perform a variety of computer-implemented functions (e.g., performing the calculations disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 22 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 22 to perform various functions including, but not limited to, controlling the operation of the valve 32, calculating time delays for the valve 32 and/or various other suitable computer-implemented functions.

Additionally, it should be appreciated that, although the system 10 is shown in FIG. 1 as including a single nozzle assembly 24 for spraying fluid F on and/or adjacent to each seed 10, the system 10 may generally include any number nozzle assemblies 24 configured for spraying one or more fluids F on and/or adjacent to each seed 14. For example, as shown in FIG. 2, in one embodiment, the system 10 may include a first nozzle assembly 124 and a second nozzle assembly 224. In such an embodiment, each nozzle assembly 124, 224 may be configured to spray the same or a different fluid F on and/or adjacent to each seed 14. In addition, the nozzle assemblies 124, 224 may be configured to spray fluid F at the same or different locations relative to the seed 14. For example, in one embodiment, both the first and second nozzle assemblies 124, 224 may be configured to spray fluid F directly onto each seed 14. Alternatively, the first nozzle assembly 124 may be configured to spray fluid F directly onto each seed 14 while the second nozzle assembly 224 may be configured to spray fluid F adjacent to each seed 14 (e.g., by spraying fluid F before and/or after each seed 14) or vice versa. In further embodiments, it should be appreciated that the system 10 may include three or more nozzle assemblies 24 configured to spray any number of fluids F on and/or adjacent to each seed 14.

Moreover, it should be appreciated that, in several embodiments, the disclosed system 10 may be combined with aspects from conventional, continuous band spraying systems. For example, in embodiments in which the system 10 includes multiple nozzle assemblies 24, one or more of the nozzle assemblies 24 may be configured to spray a continuous band of fluid F along the length of the row in which seeds 14 are being planted.

Referring now to FIG. 3, in one embodiment, the disclosed system 10 may also include a camera 50 configured to capture one or more images of each seed 14 as it is being sprayed by the nozzle assembly(ies) 24. In several embodiments, the camera 50 may comprise one or more video cameras configured to continuously capture images of the seeds 14 being sprayed. Alternatively, the camera 50 may comprise one or more still-image cameras. In such embodiments, the camera 50 may be controlled so as to only capture an image(s) at a predetermined time after the seed sensor 20 detects a seed 14 passing through the seed tube 12. For example, the camera 50 may be configured to capture an image only when a suitable control signal is received from the controller 22. As such, the controller 22 may be configured to regulate the transmission of control signals to the camera 50 based on the signals received from the seed sensor 20. For instance, in one embodiment, the camera 50 may be operated on the same time delay as the valve 32. In such an embodiment, the controller 22 may be configured to simultaneously transmit control signals to both the camera 50 and the valve 32. Alternatively, the controller 22 may be configured to transmit a control signal(s) to the camera 50 before or after the transmission of the control signal(s) for actuating the valve 32.

By capturing one or more images of each seed 14 as it is being sprayed, an operator of the system 10 may be able to monitor the accuracy of the placement of the fluid F relative to the seeds 14. For example, the images captured by the camera 50 may be transmitted to a suitable display device viewable by the operator (e.g., a display device positioned within the operator's cab of the farming equipment on which the system 10 is installed). As such, the operator may be able to view each seed 14 being sprayed and manually adjust the settings of the system 10 in the event that the seeds 14 are not being properly sprayed. For instance, the operator may be provided with a suitable control panel (communicatively coupled to the controller 22) that allows for the adjustment of the pressure and/or flow rate of the fluid F supplied to the valve 32, the duration of the valve pulse, the volume of fluid F being sprayed and/or any other suitable operating parameter.

It should be appreciated that, although the system 10 is described herein with reference to spraying seeds 14, the system 10 may generally be utilized to spray any suitable type of plant and/or plant precursor, such as seeds, seedlings, transplants, encapsulated tissue cultures and/or any other suitable plant precursors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid application system comprising:
   a sensor configured to detect plant precursors being dispensed;
   a nozzle;
   an electrically-actuated valve fluidly coupled to the nozzle and configured to control fluid flow therethrough, the valve including a poppet and a solenoid coil operable to reciprocate the poppet within the valve; and
   a controller communicatively coupled to the sensor and the valve, the controller configured to actuate the valve based on the sensor detecting a plant precursor such that fluid is dispensed onto or adjacent to each plant precursor, wherein the controller is configured to control a supply of current to the solenoid coil to displace the poppet to a throttling position intermediate a closed position and a fully-opened position to control a flow rate of the fluid through the valve.

2. The system of claim 1, wherein the controller is configured to control the supply of current to the solenoid coil to displace the poppet to the throttling position based on at least one input comprising a desired application rate.

3. The system of claim 2, wherein the controller is configured to control the supply of current to the solenoid coil to displace the poppet to the throttling position based on the desired application rate input and at least one operating parameter of the system.

4. The system of claim 3, wherein the at least one operating parameter comprises a pressure of the fluid supplied to the valve, a valve configuration parameter, a nozzle configuration parameter, or a ground speed of the system.

5. The system of claim 1, wherein the valve comprises a guide defining a valve inlet and a valve outlet, the poppet being moveable within the guide between the closed position, wherein the poppet is sealed against a portion of one of the valve outlet and the valve inlet, and the throttling position.

6. The system of claim 1, wherein displacement of the poppet to the throttling position corresponds to a pulse, the controller being configured to control a duration of the pulse in order to control a volume of the fluid dispensed onto or adjacent to each plant precursor.

7. The system of claim 6, wherein the controller is configured to control the duration of the pulse based on at least one input comprising a desired application geometry of the fluid dispensed onto or adjacent to each plant precursor.

8. The system of claim 7, wherein the desired application geometry input includes a length of the fluid dispensed along a direction of travel of the system.

9. The system of claim 6, wherein the controller is configured to control the duration of the pulse based on at least one operating parameter of the system.

10. The system of claim 9, wherein the at least one operating parameter comprises a pressure of the fluid supplied to the valve, a valve configuration parameter, a nozzle configuration parameter, or a ground speed of the system.

11. A fluid application system comprising:
    a sensor configured to detect plant precursors being dispensed;
    a nozzle;
    an electrically-actuated valve fluidly coupled to the nozzle and configured to control fluid flow therethrough, the valve including a poppet and a solenoid coil operable to reciprocate the poppet within the valve; and
    a controller communicatively coupled to the sensor and the valve, the controller configured to actuate the valve based on the sensor detecting a plant precursor such that fluid is dispensed onto or adjacent to each plant precursor, wherein the controller is configured to control a supply of current to the solenoid coil to displace the poppet for a pulse duration to control an amount of the fluid dispensed onto or adjacent to each plant precursor, wherein the pulse duration is determined based on at least one input comprising a desired application geometry of the fluid dispensed onto or adjacent to each plant precursor.

12. The system of claim 11, wherein the desired application geometry input includes a length of the fluid dispensed along a direction of travel of the system.

13. The system of claim 11, wherein the pulse duration is determined based on the desired application geometry input and at least one operating parameter of the system.

14. The system of claim 13, wherein the at least one operating parameter comprises a pressure of the fluid supplied to the valve, a valve configuration parameter, a nozzle configuration parameter, or a ground speed of the system.

15. The system of claim 11, wherein the controller is configured to control a supply of current to the solenoid coil to displace the poppet to a throttling position intermediate a closed position and a fully-opened position to control a flow rate of the fluid through the valve.

16. The system of claim 15, wherein the controller is configured to control the supply of current to the solenoid coil to displace the poppet to the throttling position based on at least one input comprising a desired application rate.

17. The system of claim 16, wherein the controller is configured to control the supply of current to the solenoid coil to displace the poppet to the throttling position based on the desired application rate input and at least one operating parameter comprising a pressure of the fluid supplied to the valve, a valve configuration parameter, a nozzle configuration parameter, or a ground speed of the system.

18. A fluid application system comprising:
- a sensor configured to detect plant precursors being dispensed;
- a nozzle;
- an electrically-actuated valve fluidly coupled to the nozzle and configured to control fluid flow therethrough, the valve including a poppet and a solenoid coil operable to reciprocate the poppet within the valve; and
- a controller communicatively coupled to the sensor and the valve, the controller configured to actuate the valve based on the sensor detecting a plant precursor such that fluid is dispensed onto or adjacent to each plant precursor, wherein the controller is configured to control a supply of current to the solenoid coil to displace the poppet to a throttling position for a pulse duration, wherein the throttling position is intermediate a closed position and a fully-opened position to control a flow rate of the fluid through the valve, wherein the pulse duration controls an amount of the fluid dispensed onto or adjacent to each plant precursor.

19. The system of claim 18, wherein the throttling position is determined based on an input comprising a desired application rate.

20. The system of claim 18, wherein the pulse duration is determined based on an input comprising a desired application geometry of the fluid dispensed onto or adjacent to each plant precursor and at least one operating parameter comprising a pressure of the fluid supplied to the valve, a valve configuration parameter, a nozzle configuration parameter, or a ground speed of the system.

21. The system of claim 18, wherein the controller is configured to determine a time delay between the sensor detecting a plant precursor and actuating the valve based on at least one operating parameter of the system.

* * * * *